United States Patent
Lysaght et al.

(10) Patent No.: US 6,438,212 B1
(45) Date of Patent: Aug. 20, 2002

(54) AUTOMATED TELEPHONE LINE TEST APPARATUS WITH INTELLIGENT DIAGNOSTIC FUNCTION

(75) Inventors: Robert J. Lysaght, Glen Ridge, NJ (US); Donald Finger, Peekskill, NY (US); Jeffrey Hahn, Greenwich, CT (US); Anthony M. Kolodzinski, Massapequa Park, NY (US); Howard Citron, South Salem, NY (US); Yu-Ling Wu, Scarsdale, NY (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 08/933,485

(22) Filed: Sep. 18, 1997

(51) Int. Cl.[7] .............................. H04M 3/08
(52) U.S. Cl. ....................................... 379/21
(58) Field of Search ............................. 379/21, 22, 23, 379/24, 25, 26, 27, 29, 30, 5, 6, 1, 1.01, 12, 10.01, 22.02, 22.07, 27.01, 27.03, 27.04; 455/423; 364/528

(56) References Cited

U.S. PATENT DOCUMENTS

| | | | |
|---|---|---|---|
| 4,076,970 A | 2/1978 | Lubarsky, Jr. et al. ... | 179/175.2 R |
| 4,159,402 A | 6/1979 | De Graauw et al. .. | 179/175.3 A |
| 4,186,283 A * | 1/1980 | Simmonds .................... | 379/21 |
| 4,581,493 A * | 4/1986 | Gazzo et al. ................. | 379/21 |
| 4,639,557 A | 1/1987 | Butler et al. .................. | 379/29 |

(List continued on next page.)

OTHER PUBLICATIONS

*CMC 7910DX DataStar 386 Generic Users Manual*, Communications Mfg. Co., 1995.
Dynatel 745 Subscriber Loop Tester Product Profile, Minnesota Mining and Manufacturing Co. (3M), 1996.
965 Subscriber Loop Analyzer (Specifications), 3M.
Specialized Products Company (1988 Fall Catalog), pp. 128, 132, 133, 135.
"The Front, A Hand–Held Computer", *Telephony*, Sep. 19, 1988, pp. 24, 25.
"Test Equipment, The Old & The New", *Teleconnect*, 9/89, pp. 78–90.
"GTE's New Line on Customer Service", *Datamation*, May 1, 1990, pp. 68–70.
Model T136BSB Circuit Test Set, Wilcom (Plantronics), 5/84.

*Primary Examiner*—Duc Nguyen
*Assistant Examiner*—Rexford N Barnie
(74) *Attorney, Agent, or Firm*—Rader, Fishman & Grauer PLLC

(57) ABSTRACT

A portable, automated telephone line test device includes a test module which applies test signals to a telephone line to be tested and detects electrical characteristics of the telephone line, and a user interface module. The user interface module includes a microprocessor, a display, a keyboard and a program memory in accordance with a standard microcomputer architecture. The processor of the user interface module is programmed to control the test module to perform a pre-programmed sequence of tests. The display provides indications of the tests being performed. The programmed sequence is varied by the device according to test results. Depending on the results obtained, the device also provides interpretative diagnostic messages and instructs the user to carry out additional test procedures.

12 Claims, 9 Drawing Sheets

U.S. PATENT DOCUMENTS

| | | | | |
|---|---|---|---|---|
| 4,670,898 A | | 6/1987 | Pierce et al. | 379/22 |
| 4,691,336 A | | 9/1987 | Durston | 379/21 |
| 4,707,848 A | | 11/1987 | Durston et al. | 379/1 |
| 4,788,708 A | * | 11/1988 | Hendrix | 379/6 |
| 4,825,392 A | | 4/1989 | Freeman | 364/550 |
| 4,837,811 A | | 6/1989 | Butler et al. | 379/96 |
| 4,843,620 A | | 6/1989 | Hagedorn | 379/21 |
| 4,920,555 A | * | 4/1990 | Ingalsbe | 379/21 |
| 4,922,516 A | | 5/1990 | Butler et al. | 379/21 |
| 4,949,290 A | | 8/1990 | Pike et al. | 364/580 |
| 5,025,466 A | | 6/1991 | Hilligoss et al. | 379/1 |
| 5,081,670 A | | 1/1992 | Reum | 379/28 |
| 5,105,438 A | | 4/1992 | Ackroff et al. | 375/8 |
| 5,121,342 A | | 6/1992 | Szymborski et al. | 364/514 |
| 5,157,708 A | * | 10/1992 | Gartwaite et al. | 379/21 |
| 5,170,114 A | * | 12/1992 | Lowenstein et al. | 324/128 |
| 5,195,124 A | | 3/1993 | Ishioka | 379/27 |
| 5,208,846 A | | 5/1993 | Hammond et al. | 379/15 |
| 5,241,277 A | * | 8/1993 | Kefalas | 324/538 |
| 5,353,326 A | | 10/1994 | Jung | 379/6 |
| 5,410,585 A | | 4/1995 | Kawaharata | 379/6 |
| 5,416,825 A | | 5/1995 | Renger et al. | 379/29 |
| 5,432,705 A | | 7/1995 | Severt et al. | 364/481 |
| 5,440,610 A | | 8/1995 | Schillaci et al. | 379/24 |
| 5,442,679 A | | 8/1995 | Regis et al. | 379/34 |
| 5,511,108 A | * | 4/1996 | Severt et al. | 379/21 |
| 5,528,661 A | * | 6/1996 | Siu et al. | 379/27 |
| 5,619,489 A | * | 4/1997 | Chang et al. | 379/21 |
| 5,629,628 A | * | 5/1997 | Hinds et al. | 379/6 |
| 5,754,624 A | * | 5/1998 | Sullivan et al. | 379/21 |
| 5,799,060 A | * | 8/1998 | Kennedy et al. | 379/29 |
| 5,825,174 A | * | 10/1998 | Parker | 374/106 |
| 5,960,060 A | * | 9/1999 | Kaibel | 379/21 |

* cited by examiner

| Loop Diagnostic Assistant | | | v1.2.0 |
|---|---|---|---|
| Job ID | Ticket Number | | |
| TEST#000003 | 9147394606 | | |

| Test For | TR | TC | RC |
|---|---|---|---|
| AC Volts | 0.3v | 0.4v | 0.6v |
| DC Volts | -48.1v | -0.3v | -51.7v |
| Current | +29.1mA | | |
| Ground | 70dB | ANI Dialed: | |
| 2WireLoss | 5.1dB | Phone Number: | |
| Noise | 20dB | 990 | |
| Power | 41dB | | |
| Balance | | | |
| Stress | 22dB | | |

Messages

The Circuit ID from the switch matches the subscriber's phone number on the trouble/service order ticket.

CID: 7394606
TN: 9147394606

ESC=STOP TESTING       08/22 01:36p

```
┌─ TIME ──────── JOB TICKET ─────────┐
│ 10:40AM        268LD01             │
│ 10:26AM        268LD01             │
└────────────────────────────────────┘
"Ohms" test(s)
  ▶      TR = 0.1kΩ
  ▶      TC = 3500.0kΩ
  ▶      RC = 3500.0kΩ
TROUBLE FOUND:
Short circuit (Tip/Ring) appears to
be the problem.
Acceptable values are:
TR, TC & RC: > 2800 kΩ

Distance to fault calculations will be
done next:
─────────────────────────────────────
Fault/Calculator:
  ▶      Section = 1
  ▶      Ohms = 100.00
  ▶      Temperature = 68
  ▶      LoadCoilsX = 0
  ▶      AWGMixed = N
  ▶      WireGaugeX = 26
  ▶      OhmsFeet = 1176.00
  ▶      Estimated distance to fault is 1176 feet
─────────────────────────────────────
ESC=QUIT      UP/DOWN=SELECT
SCROLL:PANUP/PANDN=PAGE   U/D=LINE
                           02/03 11:32a
```

Fig. 8

```
Time            Job Ticket
11:00A          N2DB2345

─────────────────────────────────────
"Ground" Test(s)
>TR = 72dB
Ground Test Complete
Found Good Ground.
Met Acceptable range: TR > 70dBmc.

"AC Voltage" Test(s)
>TR = 0.0v
>TG = 0.0v
>RG = 0.0v
Found AC voltage acceptable.
Acceptable values are:
─────────────────────────────────────
ESC=QUIT      UP/DOWN=SELECT
SCROLL:PANUP/PANDN=PAGE   U/D=LINE
```

Fig. 9

```
Time          Job Ticket
11:00A        N2DB2345
10:40A        N2DB2345
```

TR, TG = RG less than 5vAC

"DC Voltage" Test(s)
>TR = -.6v
>TG = 0.0v
>RG = 0.0v
Found Little or no DC voltage.

ESC=QUIT     UP/DOWN=SELECT
SCROLL:PANUP/PANDN=PAGE   U/D=LINE

Fig. 10

```
TIME          JOB TICKET
10:40AM       268LD01
10:26AM       268LD01
```

"Current Loop" Test(s)
>TR = +28.22 ma
Loop current test completed
Met acceptable range TR = 23-65

"2W Loss" Test(s)
> "Test Line" 7-800-555-1212
>TR = -65.8dB
Unable to get valid circuit loss reading
Acceptable range is TR < 8.5dB
Make sure the test line # is one.
which generates a 1004 Hz tone.

ESC=QUIT     UP/DOWN=SELECT
SCROLL:PANUP/PANDN=PAGE   U/D=LINE
                              02/03 11:32a

Fig. 11

AUTOMATED TELEPHONE LINE TEST APPARATUS WITH INTELLIGENT DIAGNOSTIC FUNCTION

FIELD OF THE INVENTION

This invention relates to portable apparatus for use in testing telephone lines from subscriber locations.

BACKGROUND OF THE INVENTION

It is known to provide portable equipment to be used by telephone company technicians in trouble-shooting telephone lines on which trouble is reported. It is also known to use microcomputer technology, including a keypad-responsive processor and a processor-controlled display, to aid the technician in using line-test equipment and as an interface for outputting information from the line-test equipment.

An example of portable line-test equipment which employs microcomputer technology for input and output is the CMC 7910DX DataStar 386 terminal and test module (hereinafter "DataStar 386"), sold by Communications Manufacturing Co., Los Angeles, California. The "Generic User's Manual" for the DataStar 386, published by Communications Manufacturing Co., is incorporated herein by reference.

It is an object of the invention to provide a portable telephone line test device that is easier to use than prior art devices.

It is a further object of the invention to provide a telephone line test device which automatically carries out a standardized sequence of tests.

It is still a further object of the invention to provide a telephone line test device which interprets results of tests performed by the device and automatically diagnoses sources of line troubles on the basis of the test results.

It is yet another object of the invention to provide a telephone line test device which displays interpretive messages and instructions to the user.

SUMMARY OF THE INVENTION

In accordance with the principles of the present invention, objects noted above and other advantages are realized by provision of an automated telephone line test apparatus including test circuitry for applying test signals to a telephone line to be tested and for detecting electrical characteristics of the telephone line, a processor connected to the test circuitry for controlling the test circuitry, a display connected to the processor, and a program memory connected to the processor, the processor being programmed to control the test circuitry so that the test circuitry performs a pre-programmed sequence of tests, the pre-programmed sequence of tests being performed in accordance with a program stored in the program memory and the processor also being programmed to control the display such that the display provides a sequence of indications each corresponding to a respective test of the pre-programmed sequence of tests, each indication being displayed while the corresponding test is being performed.

According to another aspect of the invention, there is provided an automated telephone line test apparatus, including test circuitry for applying test signals to a telephone line to be tested and for detecting electrical characteristics of the telephone line, the test circuitry having capabilities of performing a plurality of tests that are different from each other, a processor connected to the test circuitry for controlling the test circuitry and for receiving test results from the test circuitry, a program memory connected to the processor, and a program stored in the program memory, the program causing the processor to cause the test circuitry to perform a first one of the plurality of tests, and the program also causing the processor to select a second test from the plurality of tests on the basis of a result of a first one of a plurality of tests.

According to a further aspect of the invention, there is provided an automated telephone line test apparatus which includes test circuitry for applying test signals to a telephone line to be tested and for detecting electrical characteristics of the telephone line, a processor connected to the test circuitry for controlling the test circuitry, a display connected to the processor and a program memory connected to the processor, the processor being programmed to control the test circuitry so that the test circuitry performs a test with respect to the telephone line; the processor further being programmed to receive data from the test circuitry indicative of a result of the test and, according to the result of the test, to control the display to display a message instructing a user of the apparatus to perform a second test with respect to a cable which includes the telephone line to be tested.

According to still another aspect of the invention there is provided an automated telephone line test apparatus which includes test circuitry for applying test signals to a telephone line to be tested and for detecting electrical characteristics of the telephone line to be tested, a processor connected to the test circuitry for controlling the test circuitry, a display connected to the processor and a program memory connected to the processor, the processor being programmed to control the test circuitry so that the test circuitry performs a test with respect to the telephone line to be tested, the processor further being programmed to receive data from the test circuitry indicative of a result of the test and, according to the result of the test, to control the display means to display a string of alphabetic characters which informs a user of the apparatus of the result of the test.

According to still a further aspect of the invention, there is provided an automated telephone line test apparatus which includes test circuitry for applying test signals to a telephone line to be tested and for detecting electrical characteristics of the telephone line, the test circuitry including a plurality of test leads for being selectively connected to the telephone line, a processor connected to the test circuitry for controlling the test circuitry, a display connected to the processor and a program memory connected to the processor, the processor being programmed to control the display to display a message instructing a user of the apparatus to change a connection between the test lead and the telephone line to be tested.

The test apparatus provided in accordance with the invention carries out a complete and standardized trouble-shooting operation without relying on a high level of knowledge on the part of the test technician. An effective and consistent diagnostic procedure is programmed into the apparatus. The test sequence is adapted according to the test results and the likely source of trouble indicated by the test results. The technician is guided step by step through the test procedure and is provided with information that helps the technician to understand the process carried out by the apparatus and the meaning of the test results. The technician receives comprehensive indications of the test results, and recommendations for corrective action.

BRIEF DESCRIPTION OF THE DRAWINGS

The above and other features, advantages and aspects of the present invention will become more apparent upon reading the following detailed description in conjunction with the accompanying drawings in which:

FIGS. 4–11 illustrate various screen displays provided by the user interface module of FIG. 2.

DETAILED DESCRIPTION

Figure 1:
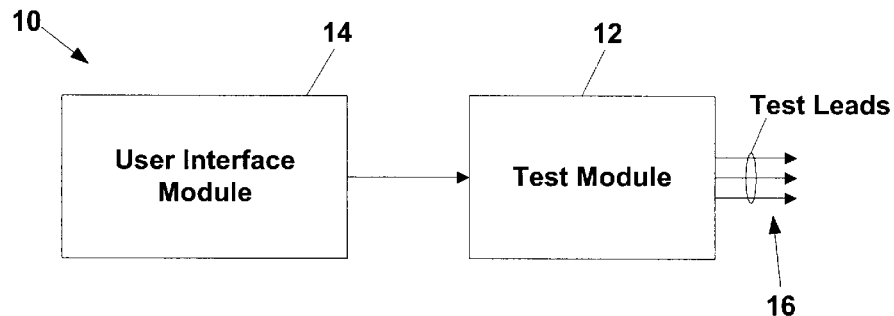
FIG. 1 is a high-level block diagram of a test apparatus provided in accordance with the invention.

A preferred embodiment of the invention is implemented as a software enhancement of a conventional device, such as the above-referenced DataStar 386 device. An overview of a suitable hardware environment for implementation of the invention is provided by FIGS. 1 and 2. In FIG. 1, a test device 10 in accordance with the operation is shown to include a test module 12 and a user interface module 14. The test module 12 has test leads 16 suitable for connection to tip, ring and ground sides of the telephone line to be tested. The test module and user interface module may respectively correspond to the test module and terminal portions of the DataStar 386 device. It is also contemplated to integrate the test module and user interface module into a single unit.

Figure 2:
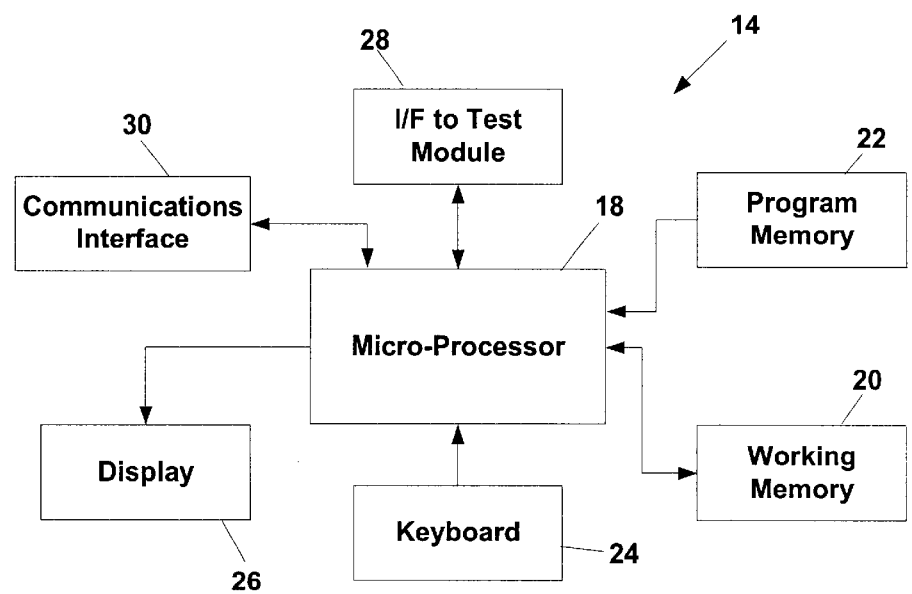
FIG. 2 is a block diagram of a user interface module that is part of the apparatus of FIG. 1.

FIG. 2 illustrates salient components of the user interface module 14, which preferably is arranged in accordance with a standard architecture for a microcomputer. Included in the module 14 are a microprocessor 18, a working memory 20 associated with the microprocessor 18, a program memory 22 which stores a program for controlling operation of the microprocessor 18, a keyboard 24 by which a user provides input to the microprocessor 18, and a display 26 by which the microprocessor provides output to the user. Also included in the module 14 are an interface 28 through which the microprocessor 18 exchanges signals with the test module 12, and a communications interface 30 through which the microprocessor 18 can exchange data with a remote device such as a host computer.

Figure 3:
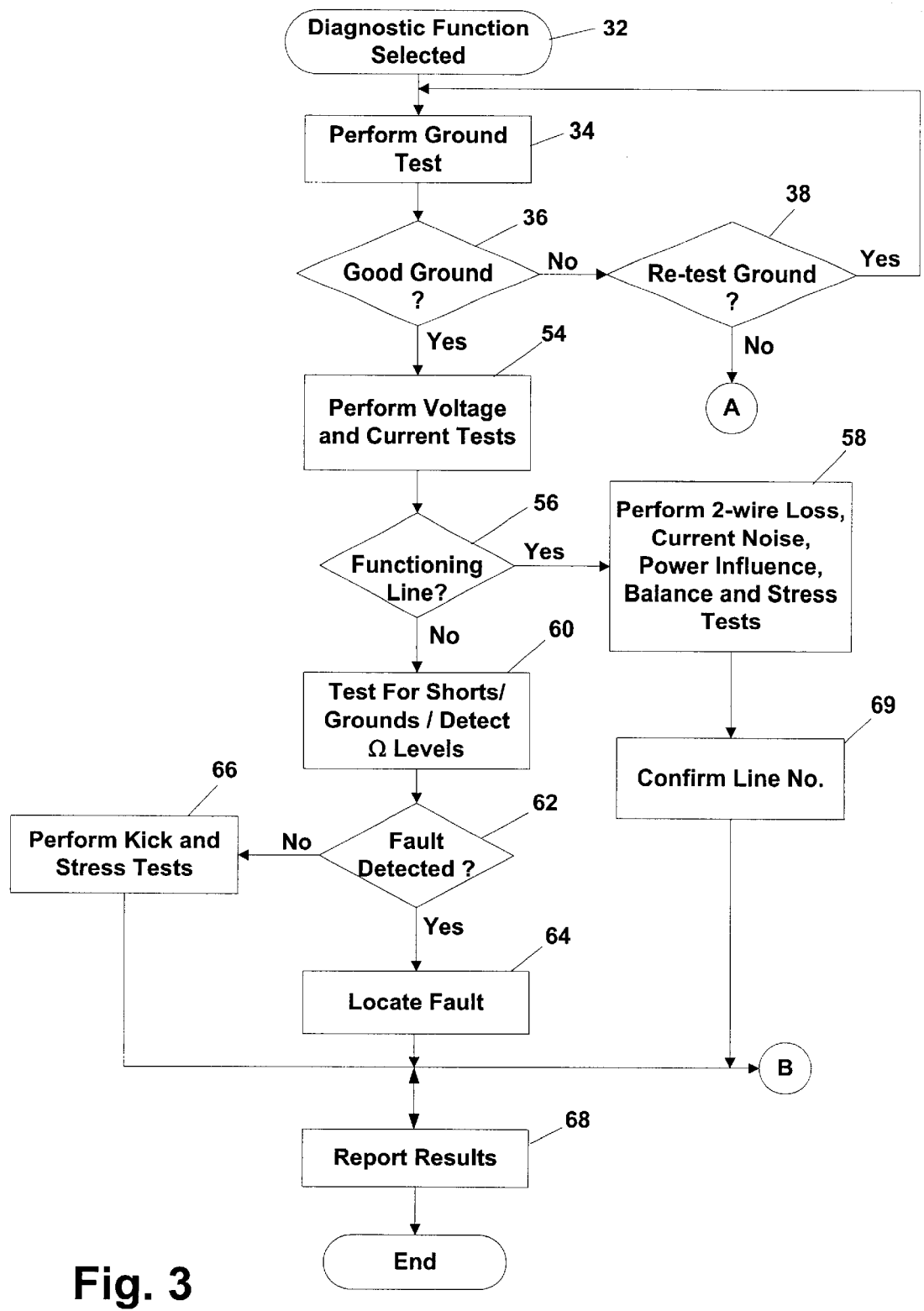
FIGS. 3, 3A, 3C are flow charts which illustrate a software program for controlling a microprocessor that is part of the user interface module of FIG. 2.
Figure 4:
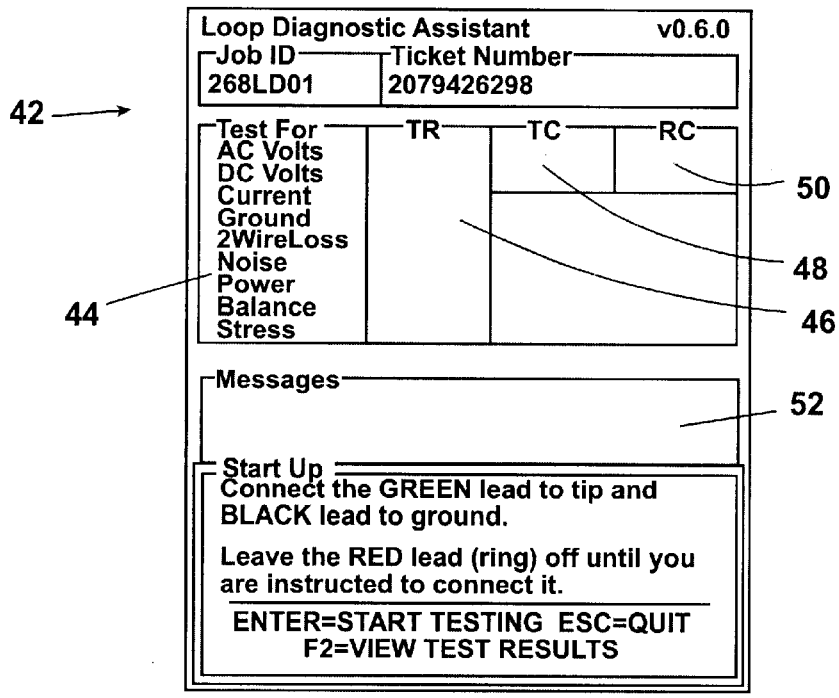

Operation of the apparatus 10 to perform telephone line trouble-shooting will now be discussed, initially with reference to FIG. 3. FIG. 3 illustrates in flow-chart form a program stored in the program memory 22 which causes the apparatus to carry out an adaptive diagnostic test sequence. The diagnostic function illustrated in FIG. 3 may be selected by the user from a main menu (not shown) displayed on the display 26. Selection of the process of FIG. 3 from the menu is indicated at initial step 32 of FIG. 3. In response to selection of the diagnostic function, a screen display like that shown in FIG. 4 is provided by the display 26. The screen display of FIG. 4 includes a number of fields, including job ID fields indicated at 42, a field 44 which lists specific tests that may be carried out by the apparatus, and test result data fields 46, 48 and 50. Included at a bottom part of the display of FIG. 4 is a message field 52. Upon initialization of the diagnostic function, the message in the message field 52 instructs the user to connect some of the test leads 16 to appropriate sides of the telephone line to be tested. The user can then initiate the diagnostic procedure.

At the beginning of the diagnostic procedure, as indicated at block 34 in FIG. 3, the test apparatus performs a test to determine whether the cable which contains the telephone line to be tested is satisfactorily grounded. Block 36 in FIG. 3 indicates that the test procedure branches depending on whether satisfactory grounding is found. If so, the apparatus proceeds to perform basic tests to determine whether basic functions are available in the telephone line to be tested (block 54) Specifically, standard tests are performed for AC and DC voltage, and loop current. On the basis of these tests, it is determined whether basic line function is present on the telephone line being tested (block 56). If so, a sequence of transmission characteristic tests are performed (block 58). If at block 56 basic line function was not found, then the procedure of FIG. 3 advances from block 56 to block 60, at which tests are performed to detect hard shorts or grounds. In a preferred embodiment, these tests include detecting resistance levels among tip, ring and ground connections. Block 62 of FIG. 3 indicates that the procedure branches, according to whether a hard short or ground is detected with respect to the tip and ring connections. If so, the location of the fault is determined (block 64). Otherwise, tests are performed to gather more information about a "soft" fault or open circuit condition (block 66) Preferably these tests include a capacitive "kick" test and a stress test. In all cases, as indicated by block 68, results of the various tests are indicated on the display 26.

Figure 3A:
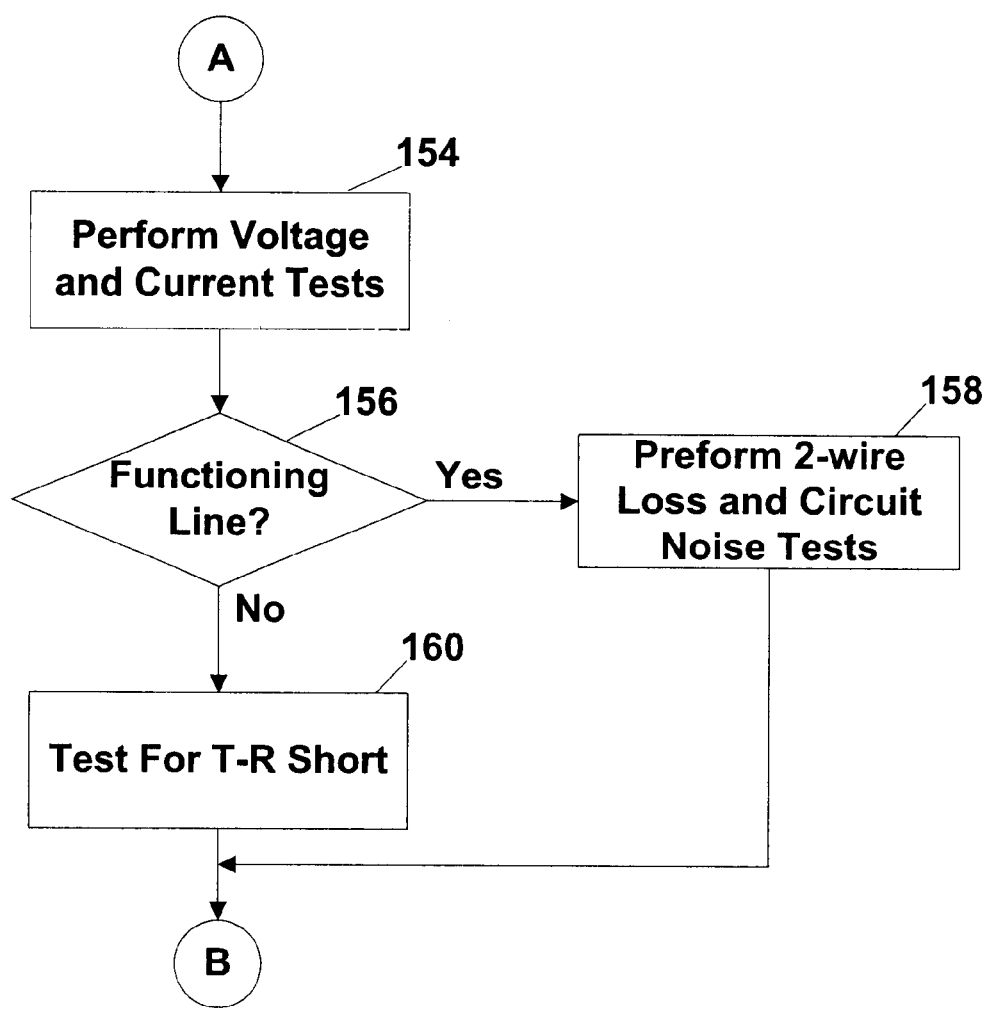

Referring again to block 36, a finding of "bad ground" at that point leads the apparatus 10 to give the user the opportunity to reattach the ground lead to the telephone cable and to retest for adequate ground (block 38). If the user elects to do so, the procedure loops back to blocks 34 and 36. Otherwise, the procedure branches to a curtailed test sequence (FIG. 3A) in which the apparatus only performs tests that can provide meaningful results in the absence of satisfactory grounding. In this case, as indicated by block 154 of FIG. 3A, the same voltage and current tests are performed as were mentioned above in connection with block 54. Then, the procedure branches (block 156) according to whether basic line function is found. If so, block 158 follows, in which the two-wire loss and circuit noise tests are performed. Power influence, balance and stress tests are omitted, since valid results cannot be obtained without good ground. If at block 156 basic line function was not found, a test for a tip-ring short circuit is performed (block 160). After either of blocks 156 and 158, the test results are reported to the user (block 68, FIG. 3).

Referring once more to FIG. 3, after the sequence of tests represented by block 58 are performed, the apparatus carries out a procedure to confirm, by machine-to-machine contact, that the telephone line that has just been tested matches the line indicated by the job assignment. This line confirmation process is represented by block 69 in FIG. 3, and will now be described with reference to FIGS. 3B and 3C.

Figure 3B:
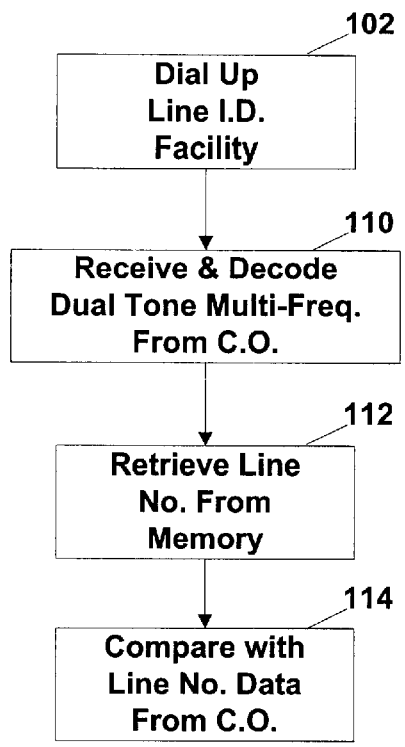
FIG. 3B illustrates operations at a central office in connection with an automatic line identification function.
Figure 3C:
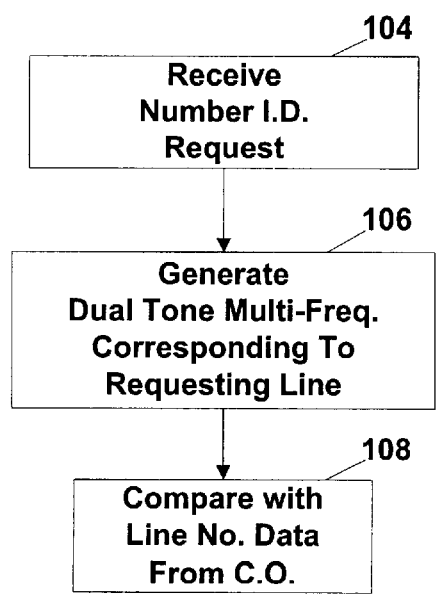

Referring initially to FIG. 3B, the test apparatus requests identification of the telephone line under test by dialing up a line identification facility provided in the central office (block 102.). That is, the test apparatus couples onto the telephone line under test pre-determined dialing signals which correspond to the telephone number (dialing no.) of the central office line i.d. facility. These dialing signals are received at the central office, which treats the dialing signals as a request to identify the telephone line on which the dialing signals are received (block 104 FIG. 3C). The central office then generates DTMF (dual tone multi-frequency) signals which represent the telephone number (dialing number) of the telephone line on which the request was received (block 106). The central office couples the DTMF signals to the requesting telephone line for transmission to the test apparatus (block 108).

Referring again to FIG. 3B, the apparatus receives the DTMF signals transmitted from the central office (block 110), and decodes the DTMF signals to produce data which indicates the telephone number corresponding to the telephone line under test. There follows block 112, at which the apparatus retrieves from memory 20 (FIG. 3) data which identifies the telephone number of the telephone line which is the intended subject of the work assignment (e.g., the telephone line on which trouble was reported). It will be understood that the work assignment data, including the number of the line to be tested, had previously been stored before commencing the test procedure. The apparatus then compares the telephone number data retrieved from memory with the telephone number data obtained by decoding the DTMF signals from the central office, to confirm that the line actually tested was the one intended to be tested according to the work assignment.

This machine-to-machine work assignment confirmation procedure represents an advance over prior art practice, in which the test technician dialed up the central office telephone line i.d. facility, and then listened to an audible verbal response, generated via speech synthesis by the central office equipment, which stated the line number of the tested line. The prior practice required the technician to match the number given by the machine-generated speech with the work assignment data specifying the line intended to be tested. The machine-to-machine confirmation procedure of FIGS. 3B and 3C relieves the technician of the effort of carrying out line i.d. confirmation, while enabling the test apparatus to automatically store data confirming that the line tested was in fact the line which was the intended subject of the test assignment.

Further details of the program illustrated in FIG. 3 will be understood from the pseudo-code listing annexed hereto as Appendix I, and from the script file printouts annexed hereto as Appendix II. In addition, the following discussion will highlight aspects of the adaptive nature of the diagnostic functions of the test apparatus 10, and particularly the guidance and information provided to the user by the apparatus.

TEST SEQUENCE EXAMPLE—NO TROUBLE FOUND

Initially, it will be assumed that the telephone line to be tested is operating in accordance with prescribed specifications in all respects. This may occur, for example, if there is an error in reporting trouble on the line, or if the line is being tested to confirm successful completion of a trouble shooting and repair operation that has already been performed with respect to the telephone line. In any case, once the diagnostic function has been started, the ground, AC voltage, DC voltage and loop current tests are performed as called for by block 54 in FIG. 3. According to the present assumption, all of those tests indicate proper functioning of the telephone line, so that the apparatus proceeds to a sequence of transmission characteristic tests represented by block 58, including a two-wire circuit loss test, a circuit noise test, a power influence test, a longitudinal balance test, and a stress test. It is to be understood that each of these individual test procedures is a standard test which is well known to those of ordinary skill in the art, and therefore need not be described in detail. As the sequence of tests represented by blocks 54 and 58 is being performed, the apparatus provides to the user indications of what the apparatus is doing at any given time. For example, the apparatus may display an indication mark such as ">" in the test sequence field 44 to indicate that the apparatus is progressing through the sequence of tests. Specifically, when the AC voltage tests is being performed, the ">" may be positioned adjacent the words "AC Volts" in field 44. When that test is complete, the indicator ">" would be moved downward so as to be adjacent to the words "DC Volts". The indicator ">" would be positioned adjacent the corresponding words in FIG. 44 as each test in the sequence is performed, concluding with the word "Stress" as the stress test was being performed at the end of the transmission characteristic tests of FIG. 58. In addition, as results were obtained for each of the tests, the fields 46, 48 and 50 would be populated with corresponding test data obtained by carrying out the respective test. In addition, the progress through the sequence of tests is reflected by verbal messages provided in the message field 52. For example, when the AC voltage test has been completed and the DC voltage is being carried out, a message such as the following may be displayed in the message field 52:

"AC Voltage tests complete. Met acceptable values: TR, TG & RG<5 vAC."

In addition, the following text may also be displayed:

"DC voltage test now being performed."

Following is a sequence of messages displayed in the message field 52 as the sequence of tests proceeds through steps 54 and 58, and satisfactory results are found throughout.

Initially, after the ground test has been performed, the message displayed is:

"Ground test complete. Found good ground. Met acceptable range: TR<70 dBrnC. Connect the ring lead (red) before continuing."

Then, when the ring lead has been connected, the apparatus performs the AC voltage test and on completing the test the following message is displayed:

"AC voltage tests complete. Met acceptable values: TR, TG & RG<5 vAC."

Then the DC voltage test would be performed, and upon completion the following message displayed:

"DC voltage tests completed. Met acceptable values: TR & RG=48–52 vDC and TG=0 vDC."

As the above tests are completed, in addition to displaying the messages indicated above, the fields 46, 48 and 50 are populated in the appropriate rows with data corresponding to the actual test results.

The sequence of tests continues, and after completion of the loop current test, the following message is displayed:

"Loop current test completed. Met acceptable range: TR=23–65 mA."

Since the voltage, current and ground tests all indicated acceptable readings, the two-wire circuit loss test is performed next. Upon completion of the test with acceptable readings, the following message is displayed.

"Circuit loss test completed. Met acceptable range: TR<8.5 dBm."

The next test is the circuit noise test. Upon satisfactory completion of this test the following message is displayed.

"Circuit noise test completed. Met acceptable range: TR<=20 dBrnC."

Then the power influence test would be performed, and upon completion the following message displayed:

"Power influence test completed. Met acceptable range: TR<90 dBrnC."

The next test to be performed is the longitudinal balance test. Upon completion of that test, the following message is displayed:

"Longitudinal balance completed. Met acceptable range: TR>=60 dBrnC."

Figure 5:
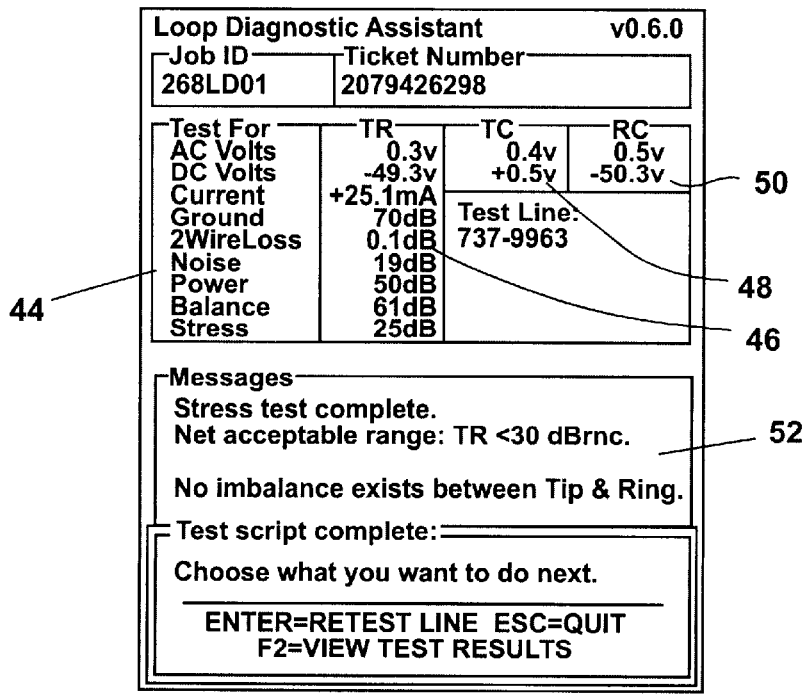

The final test in the sequence is the stress test. Upon completion of this test, the screen display of FIG. 5 would be provided. In the message field 52, completion of the test is indicated as well as finding of acceptable results. It will be noted that the fields 46, 48 and 50 have been fully populated with data indicating the results of the tests that have been performed. It will also be noted that, at the bottom of the message field 52, the user is advised that the test sequence has been completed and the user's options are presented. FIG. 5A is a screen which indicates that the apparatus has performed the automatic line number confirmation procedure described above in connection with FIGS. 3B and 3C.

EXAMPLES WITH TROUBLE FOUND

Figure 6:
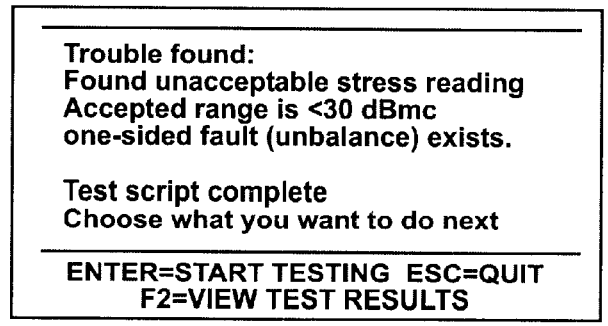

If during the sequence of tests an unacceptable reading is found, a corresponding message is provided in the message field 52. An example of such a message is shown in FIG. 6, which shows the message provided when the stress test results in an unacceptable reading. Other messages indicative of unacceptable conditions are listed in Appendix II.

Figure 7:
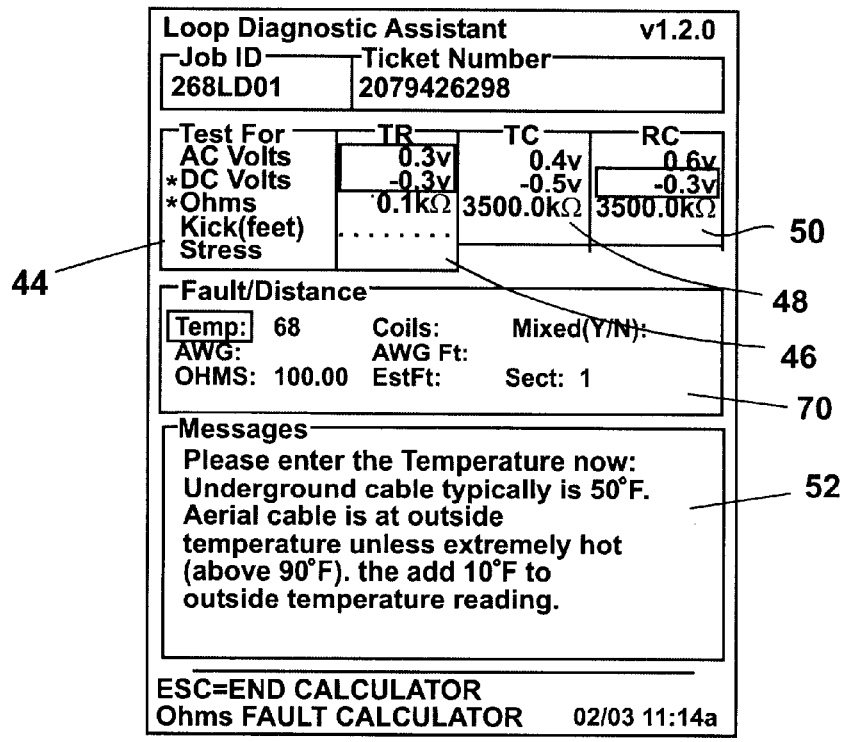

As has been discussed above, if basic line function is not found at steps 54 and 56 (FIG. 3), testing for a hard fault takes place. FIG. 7 illustrates a screen display provided when a hard fault is found. The tests for which unacceptable readings were obtained are marked with an asterisk in field 44 (in this example the "DC Volts" and "Ohms" test entries are so marked) and entries in fields 46, 48 and 50 indicative of readings outside of the acceptable range are highlighted. (In this example, the highlighted out-of-range data are the entries in field 46 (tip-ring) corresponding to the DC volts and Ohms tests, and the entry in field 50 (ring-ground) corresponding to the DC volts test.)

Figure 7A:
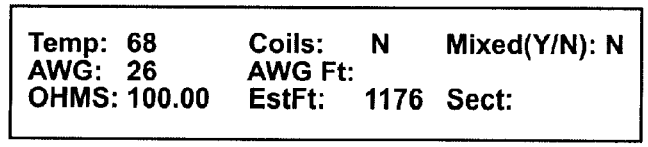

If a hard fault is found, an additional field 70 collects the data required to calculate the distance to the fault. A message in field 52 prompts the user to enter the required data. The "coils" entry is for indicating whether load coils are present on the cable. A pop-up list (not shown) prompts the user to enter the number of load coils. Entries for the wire gauge are also provided. Based on the entered data, an estimated distance to the fault is calculated and displayed, as shown in FIG. 7A. The user also has the option to change some of the parameters and have the distance calculation repeated.

When the test sequence is complete, the user is permitted to direct the apparatus to retest the line. Alternatively, the user may view the test results obtained, or may exit from the automated diagnostic function.

FIG. 8 shows an example of a screen display provided when the user elects to view test results. In this case, it is assumed that a hard fault (tip-ring short) has been found and the estimated distance to fault calculated.

FIGS. 9, 10 and 11 are other examples of screen displays provided in response to the selection of the "view test results" function. FIG. 9 illustrates an initial screen display of previously determined test results in which acceptable results are shown. The screen display of FIG. 10 may be reached by scrolling down from the display of FIG. 9. In the example shown in FIG. 10, a lack of DC voltage is indicated.

FIG. 11 is another example of a screen viewable through the "view test results" option. In this case, the two-wire circuit loss test resulted in an unacceptable reading.

Another notable feature of the present invention resides in instructions provided by the apparatus to the user to engage in additional tests in certain circumstances.

For example, if the ground test carried out by the apparatus fails to find good ground, the apparatus displays the message, "Check for breaks in ground conduit." Also, if the stress test carried out by the apparatus provides a marginal reading, the apparatus displays the message:

"One-sided fault (imbalance) may be forming. Check a good pair to see if stress reading is typical for this area—marginal outside plant."

As another example, if the "kick" test performed as part of block 66 (FIG. 3) indicates a two-sided open condition, the user is instructed:

"Check a good pair to verify kick values indicate an open condition. The stress test will be done next, to test for electrical balance."

It has been noted above that, during the course of the test sequence carried out by the apparatus, the apparatus instructs the user to change the configuration of the connection between the test leads and the line being tested. For example, after detection of adequate ground, the user is instructed to connect the ring lead to the ring side of the line. However, according to another embodiment of the invention, the user may be instructed to connect all three test leads respectively to tip, ring and ground at the beginning of the test sequence. This embodiment is further provided with suitable relays or other switches in the test module that are controlled to effectively control connection or disconnection of the lead within the test module.

It should also be noted that, in a preferred embodiment of the invention, the apparatus displays a reminder to the user that when a new line is to be tested, the test leads must be disconnected from the previous line and connected to the new line.

The portable telephone line testing apparatus disclosed herein provides significant advantages in terms of aiding telephone technicians in the performance of line troubleshooting operations. The apparatus provides automated selection and sequencing of test procedures and diagnosis of trouble on the basis of test results. The apparatus also keeps the technician informed as the test sequence proceeds, test results are obtained, and diagnostic conclusions reached. The technician is provided with step-by-step guidance as to actions needed to continue the test procedure and with recommendations for remedial actions. The apparatus is programmed to provide consistent and effective troubleshooting procedures which make efficient use of the technician's time and minimize callbacks on trouble reports.

Also, in accordance with conventional practice, the portable line-test apparatus may be connected by telephone line with a central administrative computer, so that job assignment data may be downloaded to the apparatus from the central computer. In addition, test result data and other reports on jobs performed can be uploaded to the central computer from the portable line-test apparatus. The uploaded data may include a list of the tests for which satisfactory and unsatisfactory results were founded, as well as the actual test data where the results were unsatisfactory. Also, the data uploaded by the apparatus may include a confirmation that the line number provided by the central office during the procedure of FIGS. 3B and 3C matched the number of the line specified in the work assignment. If there was not a match, the number of the line actually tested may be reported.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. An automated telephone line test apparatus, comprising:
   test circuit means for applying test signals to a telephone line to be tested, and for detecting electrical characteristics of said telephone line to be tested;
   a processor connected to said test circuit means for controlling said test circuit means;
   display means connected to said processor; and
   a program memory connected to said processor; said processor being programmed:
      to control said test circuit means such that said test circuit means performs a pre-programmed sequence of a plurality of different tests with respect to said telephone line to be tested, said pre-programmed sequence of a plurality of different tests being performed in accordance with a program stored in said program memory;
      to control said display means such that said display means provides at the start of said performance of said pre-programmed sequence of tests a display having a first field in which alphabetic information identifying each of said plurality of different tests is together listed and a second adjacent field in which the results of said tests are to be displayed and as testing proceeds to further control said display means to provide for each test: in said first field adjacent the listing of the corresponding test and during the performance of the test a display of an indication that the test is being performed; and in said second field a display of the numeric readings of the results of the test.

2. An apparatus according to claim 1, in which said plurality of different tests which are listed in said first field include at least an AC voltage test, a DC voltage test, a loop current test, a ground test and a two wire current loss test.

3. An apparatus according to claim 2, in which said plurality of different tests which are listed in said first field further includes a circuit noise test, a power influence test, a longitudinal balance test and a stress test.

4. An automated telephone line test apparatus, comprising:
   test circuit means for applying test signals to a telephone line to be tested and to a cable containing the telephone line to be tested, and for detecting electrical characteristics of said telephone line to be tested and said cable, said test circuit means having capabilities for performing a plurality of tests that are different from each other;
   a processor connected to said test circuit means for controlling said test circuit means, and for receiving test results from said test circuit means;
   a program memory connected to said processor; and
   a program stored in said program memory, said program for controlling said processor to cause said test circuit means to selectively perform said plurality of tests; and
   said program being adapted to cause for each of one or more of said plurality of tests being performed on the basis of a result of the test being performed said processor to only branch from the test being performed to subsequent tests of said plurality of tests which will provide meaningful test results, said test circuit means branching to said subsequent tests responsive to said processor.

5. An apparatus according to claim 4, wherein said test being performed is a ground test on said cable and when: said test indicates a good ground, said branch of subsequent tests has one or more of a voltage test and a loop current test on said line to be tested to determine if said line to be tested is functioning, and if said line to be tested is determined to be functioning, said branch of subsequent tests further has a two-wire circuit loss test and a circuit noise test circuit, and one or more of a power influence test, a longitudinal balance test and stress test on said line to be tested; and when said ground test indicates a failure to find a good ground, said branch of subsequent tests has one or more of a voltage test and a loop current test on said line to be tested to determine if said line to be tested is functioning, and if said line to be tested is determined to be functioning, said branch of subsequent tests further has a two-wire circuit loss test and a circuit noise test on said line to be tested.

6. An apparatus according to claim 4, wherein said test being performed is one or more of a voltage test and a loop current test on said line to be tested, and: if said test being performed indicates a functioning line, said branch of subsequent tests has a two-wire circuit loss test and a circuit noise test and one or more of a power influence test, a longitudinal balance test and stress test on said line to be tested; and if said test being performed indicates a nonfunctioning line, said branch of subsequent tests has an ohms test on said line to be tested to determine a fault on the line to be tested, and if a fault is not determined on the line to be tested, said branch of subsequent tests has one or more of a capacitive kick test and a stress test on the line to be tested.

7. An apparatus in accordance with claim 4, wherein said test being performed is an ohms test on the line to be tested to determine a fault on the line to be tested, and if said test being performed indicates: a fault has not been detected on the line to be tested said branch of subsequent tests has one or more of a capacitive kick test and a stress test on the line to be tested.

8. An automated telephone line test apparatus, comprising:
   test circuit means for applying test signals to a telephone line to be tested, and for detecting electrical characteristics of said telephone line to be tested;
   a processor connected to said test circuit means for controlling said test circuit means;
   display means connected to said processor; and
   a program memory connected to said processor;
   said processor being programmed:
      to control said test circuit means so that said test circuit means performs a test with respect to said telephone line to be tested;
      to receive data from said test circuit means indicative of a result of said test; and
      according to said result of said test, to control said display means to display a message instructing a user of the apparatus to perform a second test with respect to a cable which includes said telephone line to be tested.

9. An automated telephone line test apparatus, comprising:
   test circuit means for applying test signals to a telephone line to be tested, and for detecting electrical characteristics of said telephone line to be tested;
   a processor connected to said test circuit means for controlling said test circuit means;
   display means connected to said processor; and
   a program memory connected to said processor;
   said processor being programmed:
      to control said test circuit means such that said test circuit means performs a test with respect to said telephone line to be tested, to receive data from said test circuit means indicative of a result of said test; and according to said result of said test to control said display means to display a message instructing a user of the apparatus to perform a second test with respect to a cable which includes said telephone line, said second test being a test with respect to a wire pair other than a wire pair corresponding to said telephone line to be tested.

10. An automated telephone line test apparatus, comprising:

test circuit means for applying test signals to a telephone line to be tested, and for detecting electrical characteristics of said telephone line to be tested;

a processor connected to said test circuit means for controlling said test circuit means;

display means connected to said processor; and a program memory connected to said processor; said processor being programmed:

to control said test circuit means so that said test circuit means performs a test with respect to said telephone line to be tested;

to receive data from said test circuit means indicative of a result of said test; and according to said result of said test, to control said display means to display a string of alphabetic characters which informs a user of the apparatus of said result of said test, said string of alphabetic characters including a verbal message stating to the user that the test result is one of within a range of acceptable values and not within a range of acceptable values.

11. A method of testing a telephone line utilizing a portable test device, said test device including a test module connected to said telephone line, a microprocessor for controlling the test module, and a memory storing a program for controlling the microprocessor, the method comprising the steps of:

operating the test module to carry out a sequence of tests with respect to said telephone line in response to said stored program, said sequence of tests automatically branching on the basis of respective results of said tests;

displaying a message instructing a user of the testing device to perform a test with respect to a cable which contains said telephone line to which said test module is connected; and performing said test with respect to the cable.

12. A method of testing a telephone line utilizing a portable test device, said test device including a test module connected to said telephone line, a microprocessor for controlling the test module, and a memory storing a program for controlling the microprocessor, the method comprising the steps of:

operating the test module to carry out a sequence of tests with respect to said telephone line in response to said stored program, said sequence of tests automatically branching on the basis of respective results of said tests; and displaying a message instructing a user of the testing device to perform a test with respect to a cable which contains said telephone line to which said test module is connected;

performing said test with respect to said cable; and prior to said performing step, connecting said test module to a wire pair contained in said cable, said wire pair being different from a wire pair corresponding to said telephone line.

* * * * *